United States Patent
Liao

[11] Patent Number: 6,126,184
[45] Date of Patent: Oct. 3, 2000

[54] GOLF CART HANDLE ADJUSTING DEVICE

[75] Inventor: Gordon Liao, Tainan Hsien, Taiwan

[73] Assignee: Unique Product & Design Co., Ltd., Tainan Hsien, Taiwan

[21] Appl. No.: 09/270,973

[22] Filed: Mar. 17, 1999

[51] Int. Cl.⁷ .................................................. B62B 3/00
[52] U.S. Cl. .............................. 280/47.371; 280/DIG. 6; 280/645; 280/655; 280/646; 403/95; 403/92
[58] Field of Search ...................... 280/DIG. 6, 47.371, 280/645, 47.24, 646, 655, 652, 47.26; 16/430, 436, 900; 403/83, 84, 98, 92, 95, 321, 326, 112, 116

[56] References Cited

U.S. PATENT DOCUMENTS

| | | | |
|---|---|---|---|
| 123,707 | 2/1872 | Kind | 280/47.3 |
| 2,791,436 | 5/1957 | Wuerthner | 280/DIG. 6 |
| 3,726,537 | 4/1973 | McLoughlin | 280/DIG. 6 |
| 4,936,598 | 6/1990 | Lee | 280/DIG. 6 |
| 5,281,044 | 1/1994 | Chen | 280/DIG. 6 |
| 5,464,238 | 11/1995 | Wu | 280/DIG. 6 |
| 5,496,054 | 3/1996 | Wu | 280/DIG. 6 |
| 5,683,195 | 11/1997 | Liao | 280/DIG. 6 |

*Primary Examiner*—J. J. Swann
*Assistant Examiner*—James S. McClellan
*Attorney, Agent, or Firm*—Pro-Techtor International Services

[57] ABSTRACT

A golf cart handle adjusting device includes a fixing member, a sleeve and an elastic push member. The fixing member consists of a base portion and two wings extending in parallel from the base portion. The base portion fits around an upper end of a post rod, and the two wings have an upper slide rail and a bottom side rail parallel to each other and a plurality of U-shaped recesses behind the upper and the bottom slide rail. The sleeve fits around a handle rod, having a slide block at two sides to fit outside of the two wings. A torque spring is provided to push back the push member. When the elastic push member is pushed, the sleeve slides along the handle rod, with the engage rod portion changed to disengage from one pair of the U-shaped recesses to another, so the handle rod with the handle may be adjusted in its angle very quickly and conveniently.

4 Claims, 9 Drawing Sheets

6,126,184

GOLF CART HANDLE ADJUSTING DEVICE

BACKGROUND OF THE INVENTION

This invention relates to a golf cart handle adjusting device, particularly to one having such a structure as to be quickly and conveniently adjusted.

A golf cart has a considerable weight carrying a golf club bag, having to be pulled manually. So if its handle has an adjusting device for adjusting its angle, the golf cart may not only be balanced in its center of gravity, but suit to different height of a user, who can then pull it with less force.

A known conventional golf cart handle adjusting device shown in FIGS. 1 and 2, includes a ⊏-shaped fixing member 3 having its one end provided with a base portion 31 fitting around a post rod 2 and the other end provided with two wings 32 extending from the base portion 31 and having a plurality of holes 321. Further, a sleeve 4 is provided to be fitted around a handle rod 1, having a long groove 41 on a side near the base portion 31 for a bolt 42 to pass through the holes 321 of the two wings 32 and the groove 41 of the sleeve 4 and screwed with a nut 43 to combine the fixing member 3 tightly with the sleeve 4 and to secure the handle rod 1 at the same time.

Further, the handle rod 1 has its lower end pivotally connected to the post rod 2 with a ⊏-shaped pivotal connector 11, permitting the golf cart handle adjusting device to be extended and collapsed. The post rod 2 has an upper support member 21 formed on its upper end.

In using the conventional golf cart adjusting device, the handle rod 1 can be secured with the bolt 42 passing through the two wings 32 and the groove 41 and screwing with the nut 43, permitting the handle rod 1 move in its position with the two wings 321 and thus adjusted in its angle with several stages, as shown in FIGS. 3, 4 and 5.

As described above, the known conventional golf cart handle adjusting device can adjust the angle of the handle with several stages, but the nut 43 has to be loosened first, and the bolt 42 has to be pulled out of the holes 321 of the two wings before adjusting. Thus, its adjusting operation is rather slow and inconvenient, and in addition, the bolt 42 and the nut 43 may be lost to cause trouble when they are pulled out.

SUMMARY OF THE INVENTION

The purpose of the invention is to offer a golf Cart handle adjusting device possible to be operated quickly and conveniently in adjusting.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
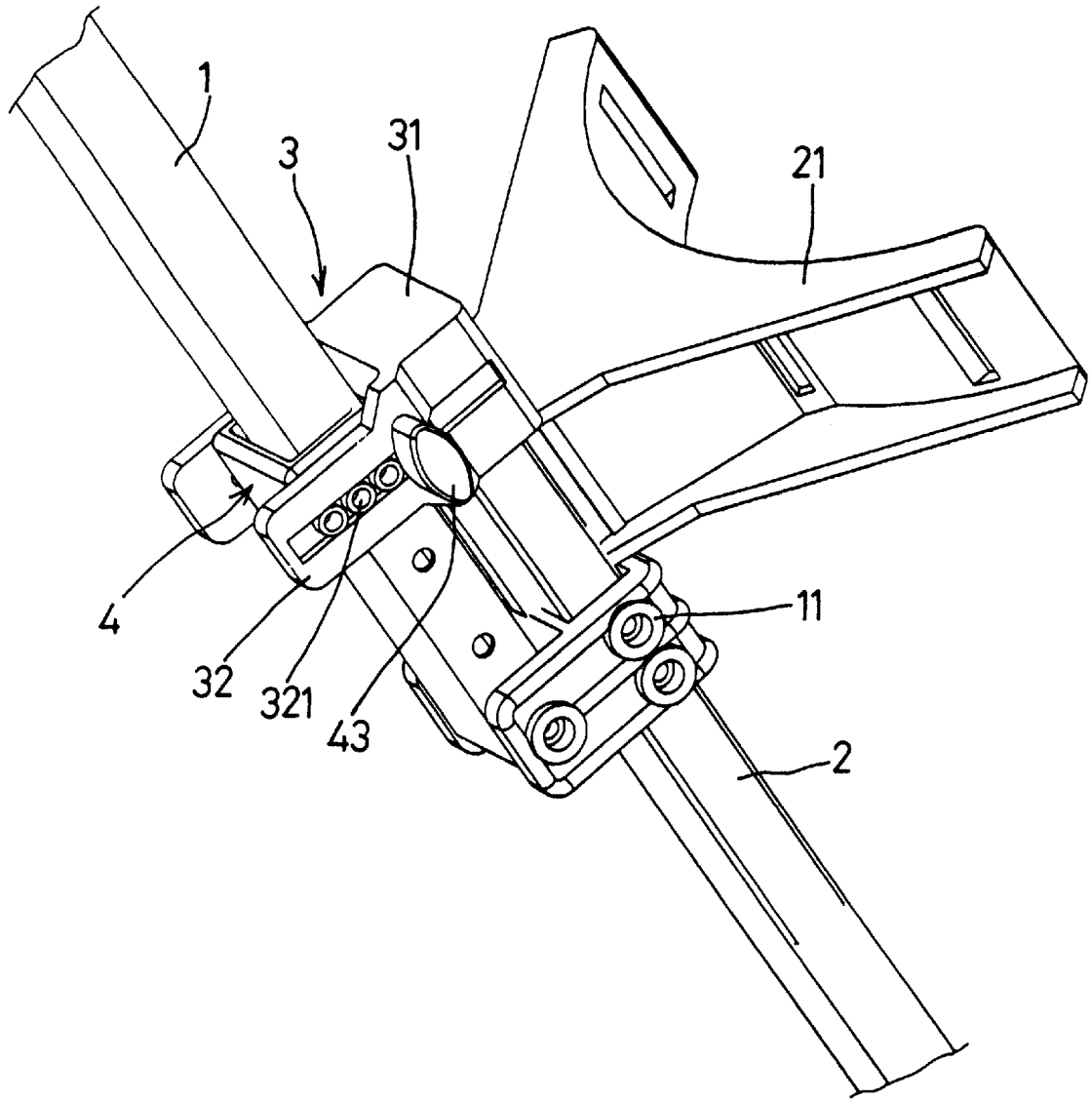
FIG. 1 is a perspective view of a known conventional golf cart handle adjusting device.
Figure 2:
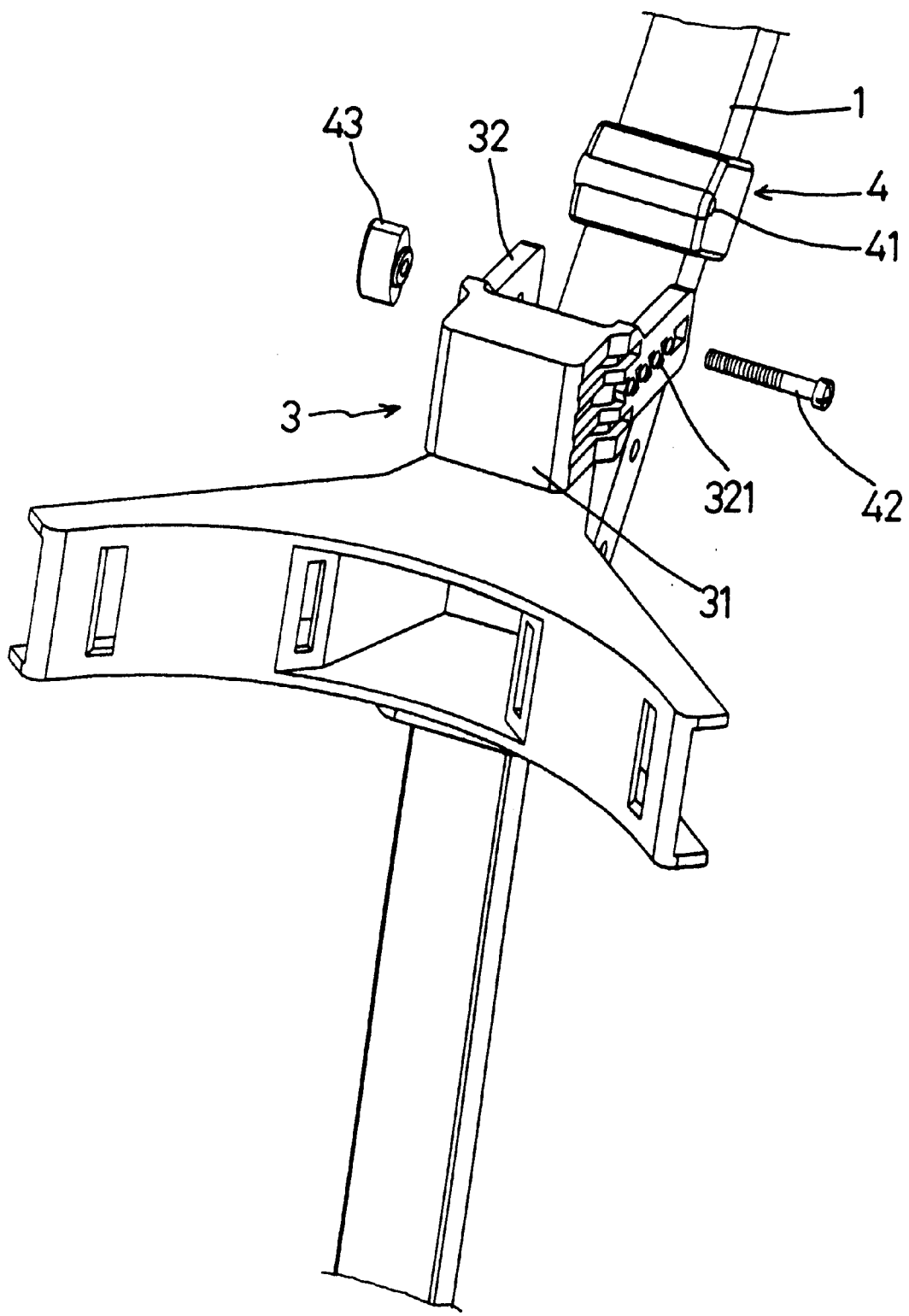
FIG. 2 is a perspective view of the known conventional golf cart handle adjusting device being operated in adjusting.
Figure 3:
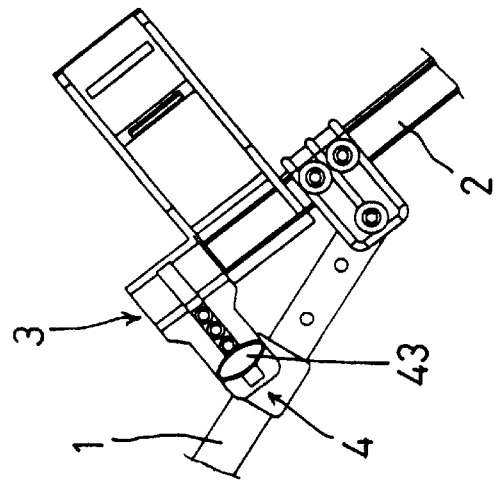
FIG. 3 is a perspective view of a handle adjusted to a first angle by the known conventional golf cart handle adjusting device.
Figure 4:
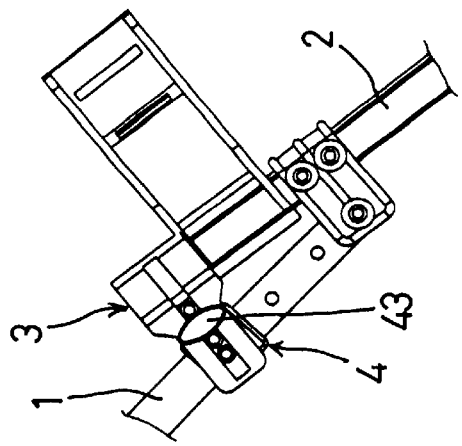
FIG. 4 is a perspective view of the handle adjusted to a second angle by the known conventional golf cart handle adjusting device.
Figure 5:
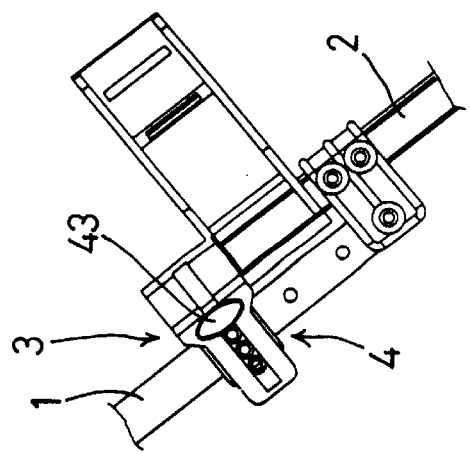
FIG. 5 is a perspective view of the handle adjusted to a third angle by the known conventional golf cart handle adjusting device.
Figure 6:
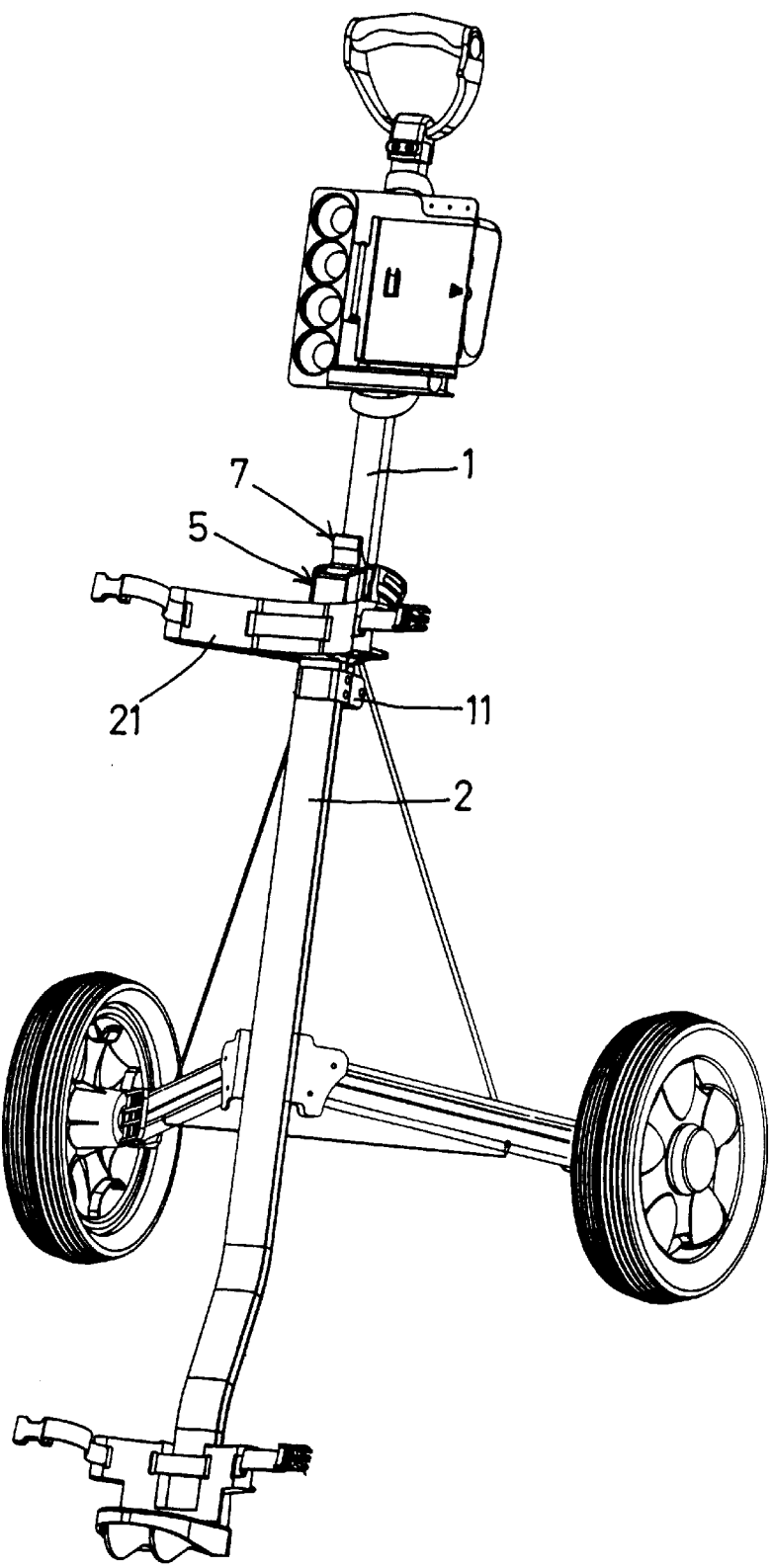
FIG. 6 is a perspective view of a golf cart handle adjusting device fixed on a golf cart in the present invention.

A preferred embodiment of the golf cart handle adjusting device in the present invention, as shown in FIGS. 6, 7, 8 and 9, includes a U-shaped fixing member 5. a sleeve 6 and an elastic push member 7 as main components combined together.

The U-shaped fixing member 5 has a base portion 51 and two wings 52. The two wings 52 respectively have two parallel curved slide rails 53, 54 formed respectively on an upper surface and a bottom surface, a long curved slot 55 formed in an intermediate portion, and a plurality of U-shaped recesses 56 on the upper surface behind the slide rail 53, 54 and near the base portion 51.

The base portion 51 of the fixing member 5 is fitting with the upper end of the post rod 2, and the two wings 52 extend in Parallel from two sides of the base portion 51. The long slot 55 is parallel to the upper and the bottom slide rails 53 and 54.

The sleeve 6 fits around the handle rod 1, having a ⊏-shaped slide block 61 at two opposite sides fitting respectively the outer sides of the two wings 52. Each ⊏-shaped slide block has a wedge-shaped projection 62 formed on an inner wall to fit in the long slot 55, and two ears 63 provided parallel between the two slide blocks 61 and located near the base portion 51.

The elastic push member 7 is shaped nearly triangular, pivotally connected in the sleeve 6 with a pin rod 71 fitting in the two ears 63, having a round engage rod portion 72 formed in a lower end, and a push member 73 formed in an upper end. Further, a torque spring 74 is fixed on the pin rod 71, having one end fixed in the sleeve 6 and the other end resting against an inner wall of the push member 73 so that the engage rod portion 72 always elastically pushed to engage one pair of the U-shaped recesses 56.

Figure 7:
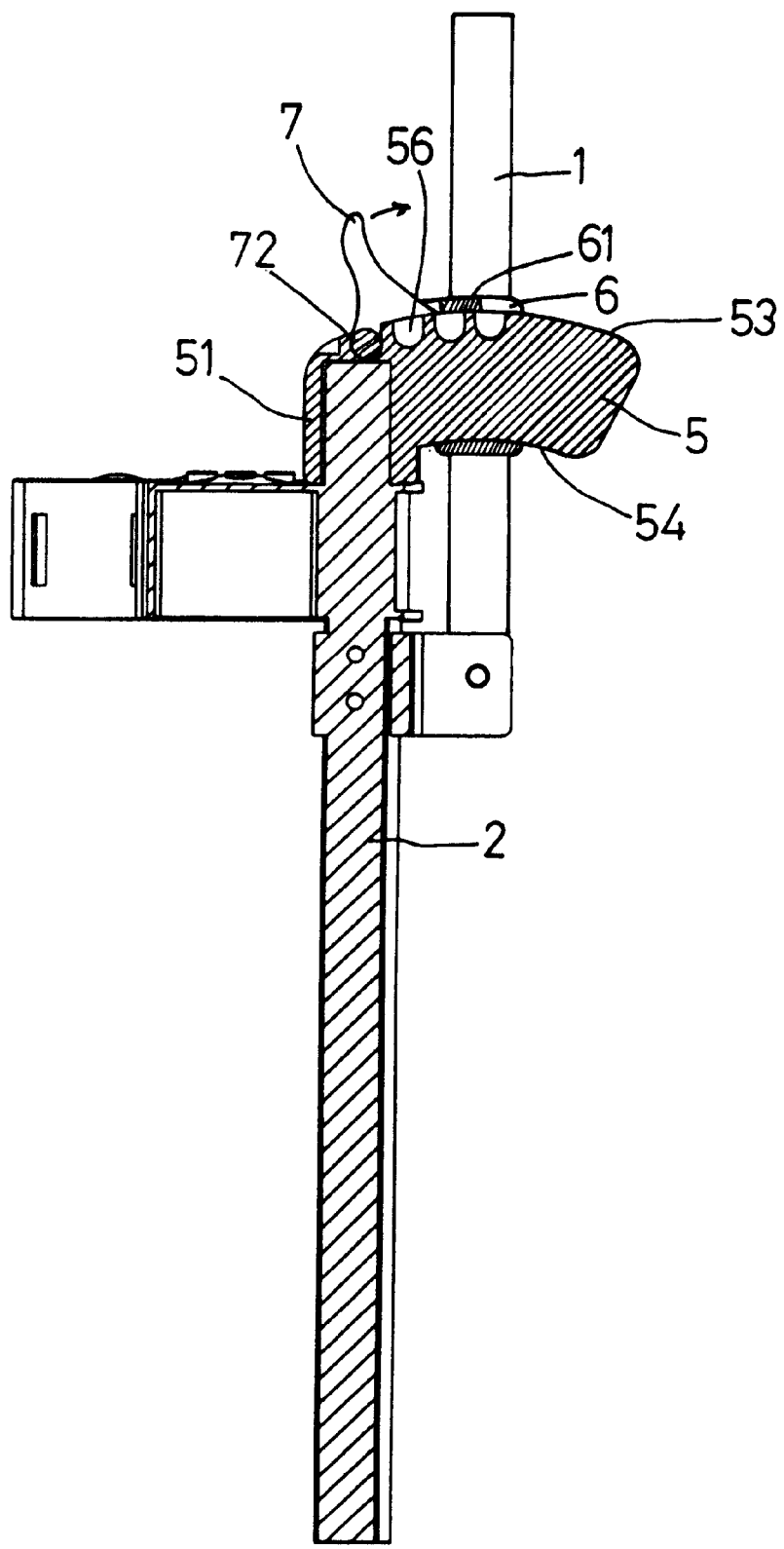
FIG. 7 is a cross-sectional view of the golf cart handle adjusting device fixed on a golf cart in the present invention.
Figure 8:
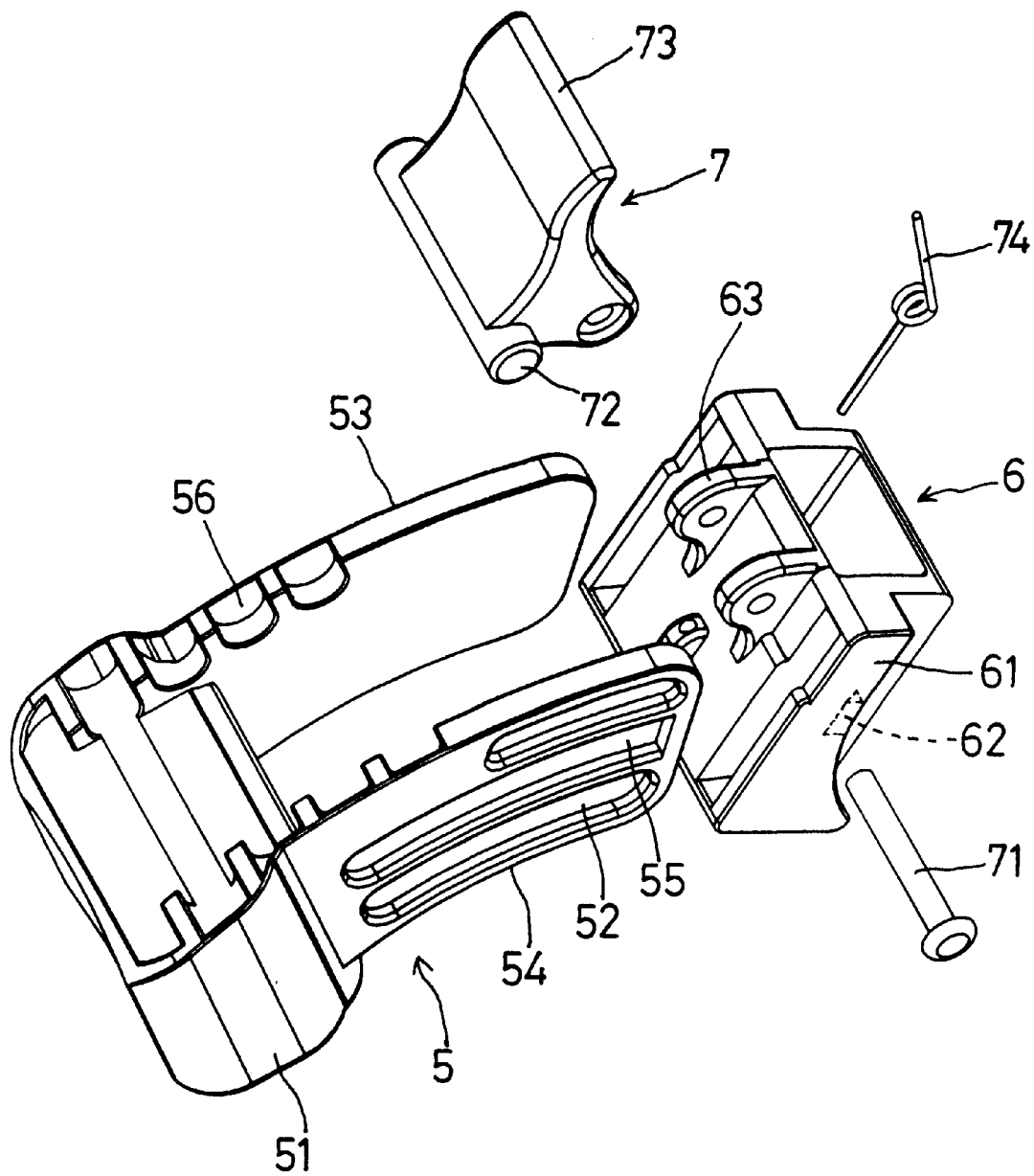
FIG. 8 is an exploded perspective view of the golf cart handle adjusting device in the present invention.
Figure 9:
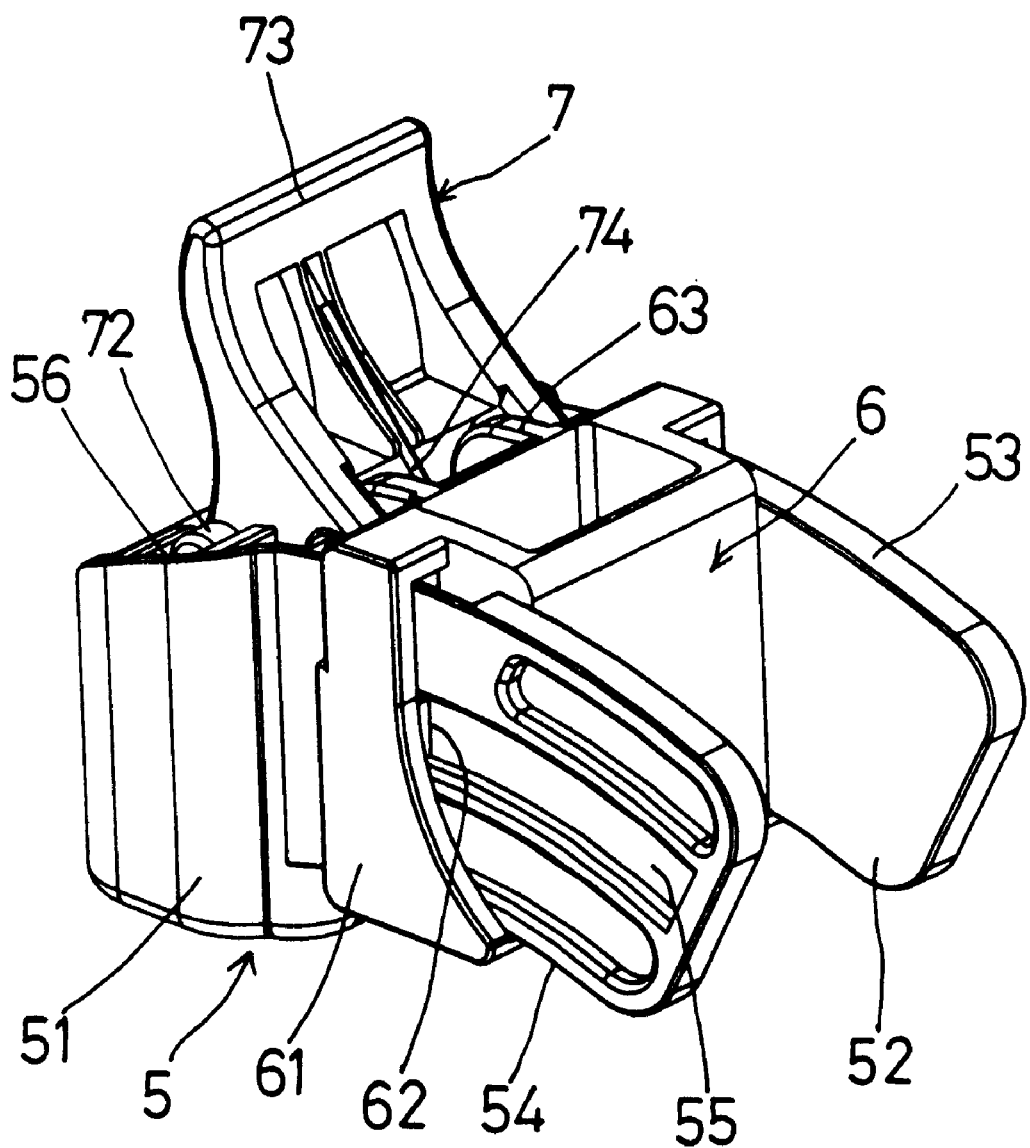
FIG. 9 is a perspective view of the golf cart handle adjusting device in the present invention.
Figure 10:
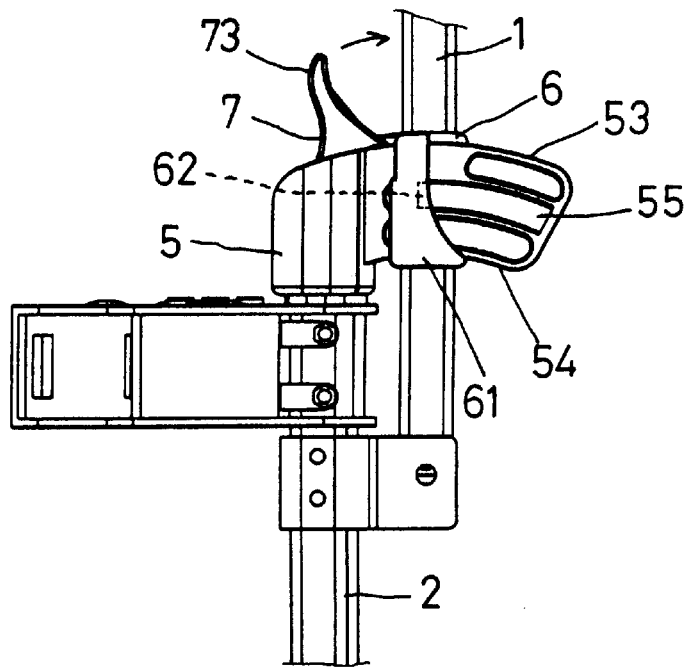
FIG. 10 is a front view of the golf cart handle adjusted to a first angle with the handle adjusting device in the present invention.
Figure 11:
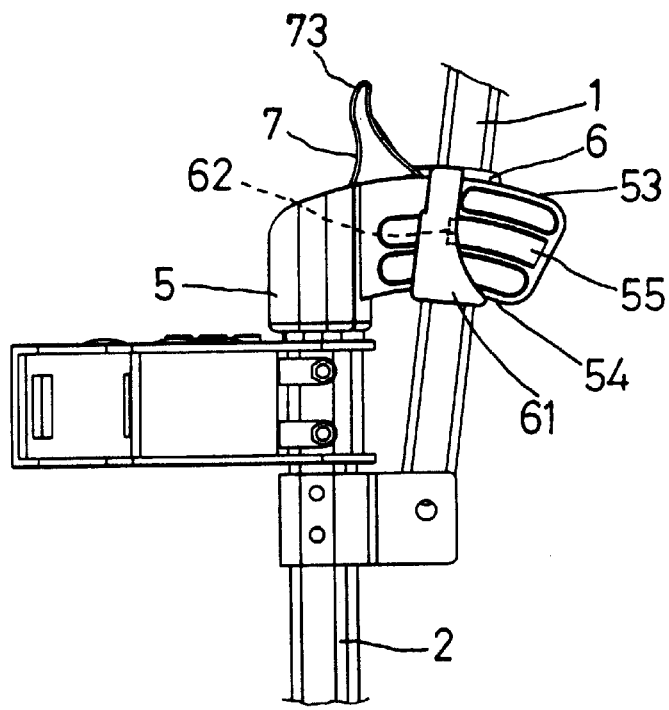
FIG. 11 is a front view of the gold cart handle adjusted to a second angle with the handle adjusting device in the present invention.
Figure 12:
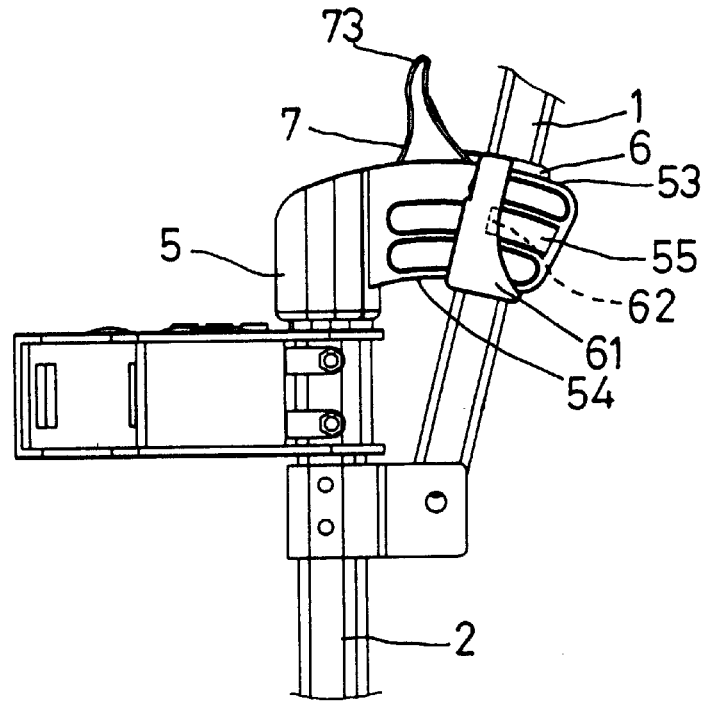
FIG. 12 is a front view of the golf cart handle adjusted to a third angle with the handle adjusting device in the present invention; and, FIG. 13 is a front view of the golf cart handle adjusted to a fourth angle with the handle adjusting device in the present invention.
Figure 13:
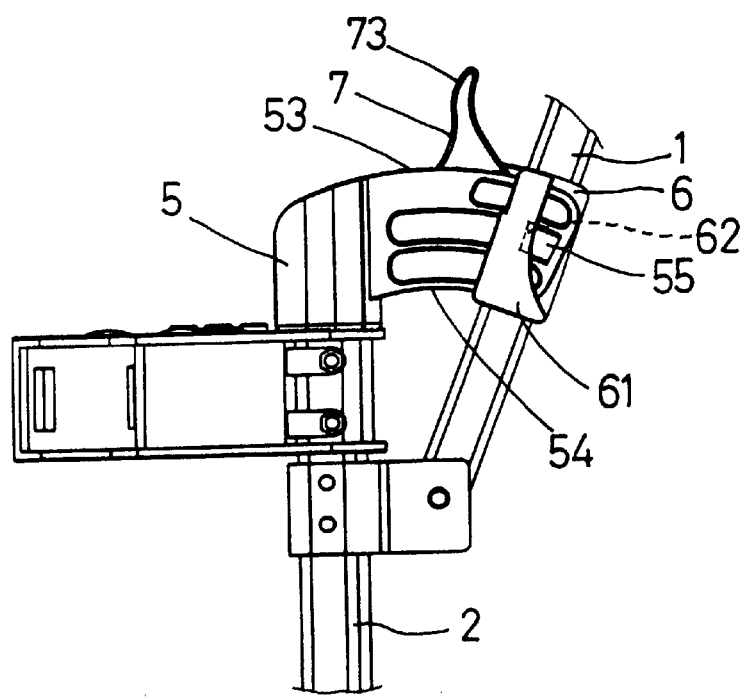

In using the handle adjusting device, as shown in FIGS. 7 and 10, the push member 73 is pushed manually to let the handle rod 1 move along the upper and the bottom slide rails 53 and 54 by means of the two slide blocks 61 of the sleeve 6 moving along the two wings 52 so that the handle rod 1 may move to the needed angle. Then the push member 73 is loosened to permit the engage rod portion 72 disengage from one pair to another pair of the U-shaped recesses 56 so as to change the angle of the handle rod 1. And as shown in FIGS.

11, 12 and 13, the adjusted angle may be one of many angles adjustable with the handle adjusting device, and its adjusting operation is very fast and convenient.

The wedge-shaped projections 62 of the slide blocks 61 of the sleeve 6 function to easily engage in and hard to disengage from the long slot 55, and to assist the slide blocks 61 to slide along the rails 53, 54, and in addition, to prevent the slide blocks 61 from sliding out of the two wings 52.

As understood from the aforesaid description, in adjusting the angle of the handle of a golf cart, the elastic push member 7 is manually pushed to move the handle rod 1, changing the position of the engage rod portion 73 engaging a selected pair of the recesses 56. Thus adjusting operation is evidently very fast and (convenient, with no components to be taken out and possible to be lost.

While the preferred embodiment of the invention has been described above, it will be recognized and understood that various modifications may be made therein and the appended claims are intended to cover all such modifications which may fall within the spirit and scope of the invention.

I claim:

1. A golf cart handle adjusting device comprising:

a fixing member consisting of a base portion and two wings, said two wings having respectively an upper and a bottom curved slide rail formed parallel to each other on an upper and the bottom surface and U-shaped recesses formed on the upper surface behind said upper slide rail near said base portion, said base portion fitting around an upper end of a post rod, said two wings extending from two sides of said base portion in parallel;

a sleeve fitting around a handle rod, having a slide block formed respectively at two sides, each said slide block fitting an outer side of said two wings respectively;

an elastic push member pivotally connected to said sleeve with a pin rod, having a push member formed in an upper portion, and an engage rod portion formed in a lower end to engage one of said U-shaped recesses of said wings; and, said elastic push member pushed to move said sleeve to slide along said handle rod, said engage rod portion of said elastic push member then changed its position to disengage from one of said U-shaped recesses to engage another of said recesses so that the handle rod is changed in its angle in various stages and consequently the handle also changed in its angle.

2. The golf cart handle adjusting device as claimed in claim 1, wherein said two wings of said fixing member respectively have a curved long slot parallel to said upper and said bottom slide rail.

3. The golf cart handle adjusting device as claimed in claim 1, wherein said two slide blocks of said sleeve respectively have a wedge-shaped projection on an inner wall of each said slide block to fit in a curved long slot of said two wings.

4. The golf cart handle adjusting device as claimed in claim 1, wherein said elastic push member is piovtally connected to said sleeve by means of a pin rod, and a torque spring is provided, having one end fitted in said sleeve and the other end resting against an inner wall of said push member to continuously elastically bias said elastic push member.

* * * * *